United States Patent [19]
Tachigori

[11] Patent Number: 6,058,234
[45] Date of Patent: May 2, 2000

[54] STRUCTURE FOR MOUNTING AN OPTICAL DEVICE

[75] Inventor: Masashi Tachigori, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/964,106

[22] Filed: Nov. 5, 1997

[30] Foreign Application Priority Data

Nov. 5, 1996 [JP] Japan ................................ 8-292699

[51] Int. Cl.$^7$ ........................................... G02B 6/30
[52] U.S. Cl. .................. 385/49; 385/88; 385/14
[58] Field of Search ............................. 385/49, 88–94, 385/14

[56] References Cited

U.S. PATENT DOCUMENTS 5,621,837   4/1997   Yamada et al. ........................... 385/88

FOREIGN PATENT DOCUMENTS

| 0 718 653 A2 | 6/1996 | European Pat. Off. . |
|---|---|---|
| 63-143890 | 6/1988 | Japan . |
| 6132550 | 5/1994 | Japan . |
| 6-160676 | 6/1994 | Japan . |
| 6-201930 | 7/1994 | Japan . |
| 7-225329 | 8/1995 | Japan . |
| 8-181388 | 7/1996 | Japan . |
| 9-0151108 | 2/1997 | Japan . |
| 2 276 492A | 9/1994 | United Kingdom . |

OTHER PUBLICATIONS

1996 Electronics Data Communications Society, Electronics Society COnvention, C205, p. 205. No month.
Sasaki, J., et al., (1995) "Self–Aligned Assembly Technology for Laser Diode Modules Using Strip–Type AuSn Colder Bump Flip–Chip Bonding" *IEEE*, vol. 2, No. Conf.8:234–235 No month.
Hayashi, T. (1992) "An Innovative Bonding Technique for Optical Chips Using Solder Bumps that Eliminate Chip Positioning Adjustments", *IEEE Transactions On Components, Hybrids, And Manufacturing Technology*, vol. 15, No. 2:225–230 Apr.
Wale, M.J. (1990) "Self–Aligned, Flip Chip Assembly of Photonic Devices with Electrical and Optical Connections", *IEEE* vol. 1, No. Conf. 40:34–41 May.
IBM Technical Disclosure Bulletin (1993) vol. 36, No. 1:173–175 Jan.
Nakasuga, Y., et al. (1996) "Multi–Chip Hybrid Integration on PLC Platform Using PassiveAlignment Technique"*IEEE, 1996 Proceedings of the 46th Electronic Components And Technology Conference*, Conf. 46:20–25 no month.

Primary Examiner—John D. Lee
Assistant Examiner—Ellen E. Kim
Attorney, Agent, or Firm—Scully, Scott, Murphy & Presser

[57] ABSTRACT

An optical device mounting structure of the present invention has an optical device 3 and a substrate for mounting the optical device 3. The optical device 3 includes a surface 3a facing a mounting surface 1a included in the substrate 1. First electrodes 5 are provided on the surface 1a while second electrodes 7 are provided on the surface 3a and respectively facing the first electrodes 5. First connection members 9 intervene between and connect the first and second electrodes 5 and 7. After marks 31a and marks 31b provided on the surfaces 1a and 3a, respectively, have been brought into register, the first connection members 9 and a second connection member 118 are fused with projections 19 and surface 1a contacting each other. The structure allows the optical device 3 to be accurately mounted to the substrate 1 without any adjustment.

11 Claims, 5 Drawing Sheets

STRUCTURE FOR MOUNTING AN OPTICAL DEVICE

BACKGROUND OF THE INVENTION

The present invention relates to an optical module for optically connecting an optical device and an optical waveguide provided on a substrate and, more particularly, to a structure for allowing the optical device to be accurately mounted to the substrate with respect to a reference plane without any adjustment.

An optical device mounting structure is disclosed in, e.g., Japanese Patent Laid-Open Publication No. 63-143890. In the structure taught in this document, an end-face emission type semiconductor laser including an active layer is mounted on a substrate. The substrate is formed with an optical waveguide. To guide a beam issuing from the laser to the waveguide, a recess slightly greater in size than the laser is formed in the substrate. Electrodes are positioned on the bottom of the recess in order to connect electrodes provided on the laser and connection members implemented by solder.

However, a problem with the above conventional structure is that the optical axis between the laser and the waveguide and the position in the vertical direction have their accuracy determined simply by the processing accuracy of the lug and the mounting accuracy of the laser to the lug. Because the lug and laser must be abutted against each other with preselected accuracy in height, the mounting accuracy is only of the order of several microns. Moreover, the laser is connected to the substrate by relying only on the connection members implemented by solder. As a result, it is likely that the optical axis of the laser is inclined in the horizontal direction and/or angularly displaced due to the fusing of the connection members, failing to align with the optical axis of the waveguide In another conventional structure, a lug formed with fine grooves is positioned on the bottom of a recess formed in a substrate. A member having high thermal conductivity intervenes between and connects the surface of a semiconductor layer and the top of the lug in order to enhance heat radiation. However, it is extremely difficult to control the thickness of the above member and therefore to guarantee mounting accuracy.

SUMMARY OF THE INVENTION

It is therefore an object of the present invention to provide an optical device mounting structure free from the drawbacks particular to the conventional structures as discussed above.

In accordance with the present invention, a structure for mounting an optical device includes a substrate including a mounting surface including phantom lines parallel to an optical axis. An optical device to be mounted to the substrate includes a surface facing the mounting surface when the device is mounted to the substrate. A plurality of first electrodes are provided on the mounting surface and spaced from each other by a preselected distance to be connectable to the optical device. A plurality of second electrodes are provided on the surface of the optical device and correspond one-to-one to the first electrodes. A plurality of first connection members connect the first electrodes and second electrodes. An optical waveguide is formed on the surface of the optical device and spaced from each of the second electrodes by a preselected distance. A third electrode is provided on a part of the waveguide on the surface of the optical device. A fourth electrode is provided on the mounting surface and faces the third electrode when the optical device is mounted to the substrate. A second connection member connects the third and fourth electrodes. A projection protrudes from a preselected portion of the mounting surface other than portions corresponding to the second and third electrodes and waveguide of the optical device. The surface of the optical device is capable of contacting the projection.

Also, in accordance with the present invention, a structure for mounting an optical device includes a substrate including a mounting surface including phantom lines parallel to an optical axis. An optical device to be mounted to the substrate includes a first surface facing the mounting surface when the optical device is mounted to the substrate. A first electrode is provided on the mounting surface to be connected to the optical device when the optical device is mounted to the substrate. A second electrode is provided on the first surface of the optical device and corresponds to the first electrode. A connection member is provided for connecting the first and second electrodes. A third electrode is provided on a second surface of the optical device facing the first surface. A plurality of lugs protrude from the mounting surface for mounting the optical device in contact with the first surface of the optical device. The lugs face the first surface of the optical device except for the second electrode when the optical device is mounted to the substrate.

Further, in accordance with the present invention, a structure for mounting an optical device has an optical device fabricated by a crystal growth technology, and a substrate for mounting the optical device. A projection is formed on the substrate by a film forming technology for supporting the optical device and positioning the optical device in a direction perpendicular to an optical axis. A plurality of marks are provided on each of the substrate and optical device for positioning the substrate and optical device in a horizontal direction.

BRIEF DESCRIPTION OF THE DRAWINGS

The above and other objects, features and advantages of the present invention will become apparent from the following detailed description taken with the accompanying drawings in which.

Figure 1:
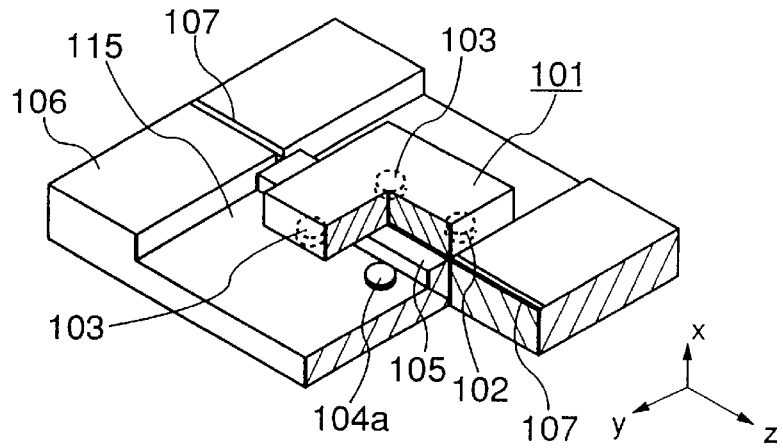
FIG. 1 is a perspective view showing a conventional optical device mounting structure.

In the drawings, identical references denote identical structural elements.

DETAILED DESCRIPTION OF THE DRAWINGS

To better understand the present invention, brief reference will be made to a conventional optical device mounting structure, shown in FIG. 1. The structure to be described is taught in Laid-Open Publication No. 63-143890 mentioned earlier. As shown, an end-face emission type semiconductor laser 101 including an active layer 102 is mounted on a substrate 106. The substrate 106 is formed with an optical waveguide 107. To guide a beam issuing from the laser 101 to the waveguide 107, a recess 115 slightly greater in size than the laser 101 is formed in the substrate 106. Electrodes 104a are positioned on the bottom of the recess 115 in order to connect electrodes, not shown, provided on the laser 101 and connection members 103 implemented by solder. A lug 105 is formed on the bottom of the recess 115 in the vicinity of the center of the laser 101 such that the emitting end of the laser 101 and waveguide 107 optically align with each other.

The laser 101 rests on and extends across the lug 105, as illustrated. In this condition, the laser 105 is connected to the substrate 106 by the connection members 103. Therefore, in the Y-Z plane, the laser 101 is automatically positioned by the self-matching function of the connection members 103. In the X-Z plane, the laser 101 is positioned by being abutted against the lug 105 which is provided with an accurate height. In this manner, the laser 101 can be positioned in the X, Y and Z directions without any adjustment. As for the height, the top of the lug 105 can be provided with accuracy of the order of less than submicrons by RIE (Reactive Ion Etching).

Figure 2:
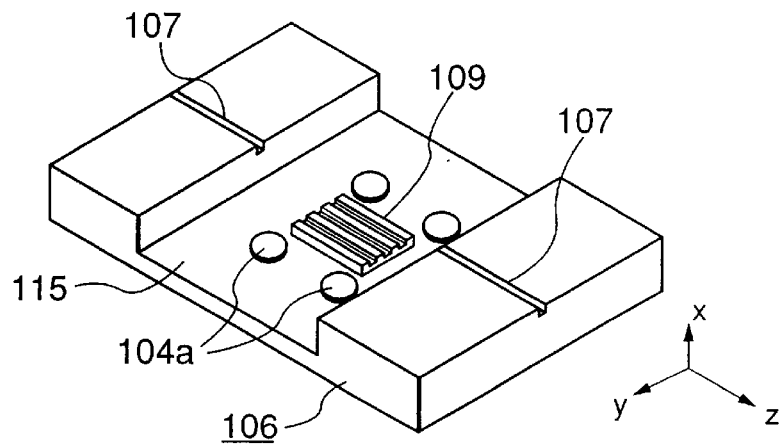
FIG. 2 is a perspective view showing another conventional optical device mounting structure.
Figure 3:
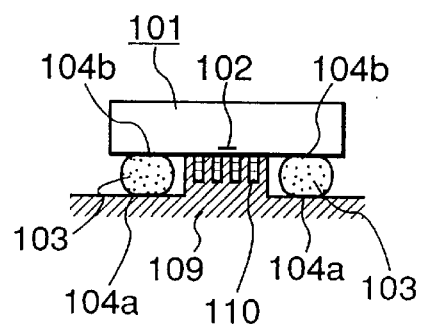
FIG. 3 is a section of an optical device shown in FIG. 2.

FIGS. 2 and 3 show another conventional optical device mounting structure. As shown, a lug 109 formed with fine grooves is formed on the bottom of the recess 115 of the substrate 106. Electrodes 104b are provided on the semiconductor laser 101. The reference numeral 110 designates a member having high thermal conductivity.

In the configuration shown in FIGS. 2 and 3, assume that the top of the lug 109 has a relatively broad area, and that the bottom of the laser 101 and the top of the lug 109 are bonded to each other by a member having high thermal conductivity. Then, it is likely that the thickness of the member on the top of the lug 109 is irregular and renders the height of the laser 101 in the X direction irregular. The fine grooves formed in the top of the lug 109 solves this problem. Specifically, even when the thickness of the member 110 is irregular, the member 110 having high thermal conductivity is absorbed in the fine grooves of the lug 109 due to the weight of the laser 101. The laser 101 can therefore be accurately held in the expected height in the X direction.

The conventional structures described above have the following problems left unsolved. In the structure shown in FIG. 1, the optical axis between the laser 101 and the waveguide 107 and the height of the laser 101 have their accuracy determined simply by the processing accuracy of the lug 105 and the mounting accuracy of the laser 101 to the lug 105. Because the lug 105 and laser 101 must be abutted against each other with preselected accuracy in height, the mounting accuracy is only of the order of several microns. Moreover, the laser 101 is connected to the substrate 106, relying only on the connection members 103 implemented by solder. The prerequisite is therefore that the connection members 103 be arranged at balanced positions with respect to the lug 115 located at the center of the laser 101. Should the connection members 103 be not so positioned when connecting the electrodes 104a and 104b, the optical axis of the laser 101 would be inclined in the horizontal direction and/or angularly displaced and would fail to align with the optical axis of the waveguide 107. In addition, it is extremely difficult to control the connection members 103 as to volume, degree of melting, and stress ascribable to solidification, and therefore to accurately hold the lug 105 and laser 101 in close contact via the connection members 103.

In the configuration shown in FIG. 2, the member 110 intervenes between the lug 109 formed with the fine grooves for heat radiation and the laser 101. The member 110, however, obstructs the accurate mounting of the laser 101. Even with the fine grooves of the lug 109, it is difficult to control the thickness of the member 110 and ensure accurate mounting on the basis of the weight of the laser 101 and the stress of the connection members 103.

As stated above, the mounting accuracy available with the conventional technologies is limited to the order of several microns. Although the conventional structures are suitable for the connection of the laser 101 to a multimode optical waveguide, they cannot implement the connection of the laser 101 to a single mode optical waveguide needing mounting accuracy of the order of submicrons.

Furthermore, the conventional structures lack in reliability. Specifically, the mounting surface of the substrate 106 is positioned just below the active layer 102 of the laser 101, so that the active layer 102 is constantly subject to a stress. Particularly, a semiconductor laser for high-speed modulation drive, a waveguide type light-sensitive element, a semiconductor modulator and so forth are easily damaged when subjected even to a slight stress. Therefore, the conventional structures are not applicable to optical modules needing reliability.

Figure 4:
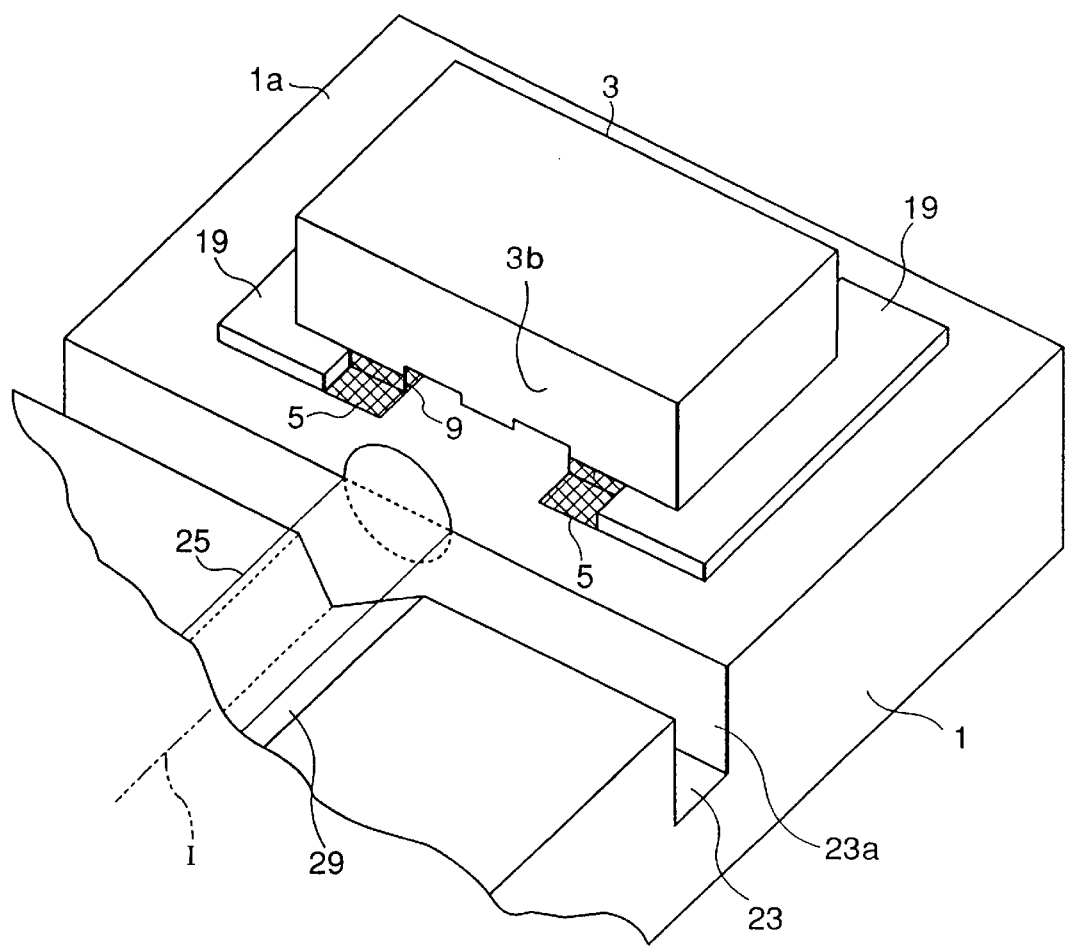
FIG. 4 is a perspective view showing a waveguide type light-sensitive module including an optical device mounting structure embodying the present invention.
Figure 5:
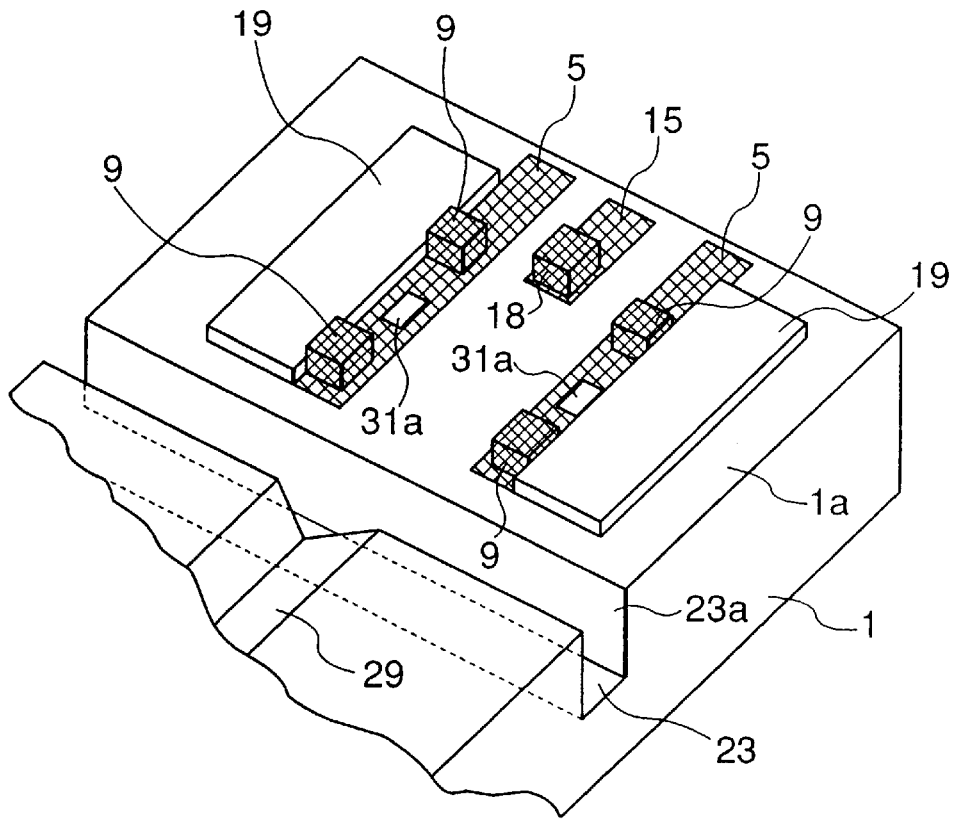
FIGS. 5 and 6 are perspective views respectively showing a substrate and an optical device included in the embodiment of FIG. 4.
Figure 6:
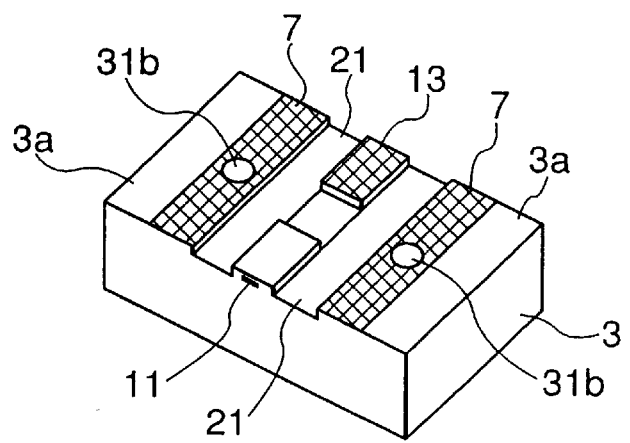

Referring to FIGS. 4–6, an optical device mounting structure embodying the present invention is shown and has a substrate 1 and an optical device 3 mounted on the substrate 1. As shown, the substrate 1 has a mounting surface 1a including phantom lines parallel to an optical axis I. The optical device 3 has a surface 3a (FIG. 6) facing the mounting surface 1a of the substrate 1.

As best shown in FIG. 5, a pair of first electrodes 5 are provided on the mounting surface 1a and spaced from each other by a preselected distance such that the electrodes 5 contact the optical device 3. The electrodes 5 are implemented as elongate strips extending in the direction of the optical axis I. As best shown in FIG. 6, a pair of second electrodes 7 are provided on the surface 3a of the optical device 3 and correspond one-to-one to the first electrodes 5. A plurality of first connection members 9 intervene between and connect the first electrodes 5 and second electrodes 7.

An optical waveguide (emitting portion) 11 is formed on the surface 3a of the optical device 3 and spaced from each second electrode 7 by a preselected distance. A third electrode 13 is positioned in a part of the waveguide 11. A fourth electrode 15 is provided on the mounting surface 1a of the substrate 1 in such a manner as to face the third electrode 13. The electrodes 13 and 15 are connected together by a second connection member 18. Channels 21 intervene between the second and third electrodes 13 and 15.

A pair of projections 19 are formed on the mounting surface 1a of the substrate at preselected positions other than the positions where the first and fourth electrodes 5 and 15 and the portion facing the waveguide 11 are located. In the illustrative embodiment, the projections 19 are implemented by $SiO_2$ films while the substrate 1 is formed of Si. The projections 19 face the surface 3a of the optical device 3 except for the second and third electrodes 7 and 13. The projections 19 are positioned outside of the first electrodes 5 in the direction perpendicular to the optical axis I and held in contact with the surface 3a of the optical device 3.

The optical device 3 includes a surface 3b perpendicular to the surface 3a and optical axis I. The mounting surface 1a is formed with a stop groove 23 adjoining and parallel to the surface 3b, and a positioning groove 29 extending from the stop groove 23 in the direction of the optical axis I. The positioning groove 29 has a generally V-shaped section and positions an optical fiber or similar optical transmission member 25. The optical transmission member 25 has its end face partly abutted against a wall 23a included in the stop groove 23. In this condition, the transmission member 25 is prevented from moving in the direction of the optical axis I.

In the illustrative embodiment, the optical device 3 is a waveguide type light-sensitive element including a semi-insulating InP substrate. The waveguide 11 and surface 3a are formed on the InP substrate by MBE (Molecular-Beam Epitaxy). The first to fourth electrodes 5, 7, 13 and 15 are formed by forming TiPtAu films on alloy electrodes and then plating them with Au. The first and second connection members 9 and 18 are implemented by AuSn solder.

The surfaces 1a and 3a are respectively provided with a plurality of marks 31a and a plurality of marks 31b for locating the optical device 3 at a preselected position on the surface 1a. The marks 31a and 31b are respectively included in the first electrodes 5 and second electrodes 7.

To mount the optical device 3 to the substrate 1, the former is positioned on the latter by using the marks 31a and 31b and infrared transmission light. Then, the first and second connection members 9 and 18 implemented by AuSn solder are fused in order to connect the first to fourth electrodes 5, 7, 13 and 15. At the same time, the projections 19 are brought into contact with the surface 3a of the optical device 3. It is noteworthy that the channels 21 intervene between the projections 19 and the waveguide 11 and free the waveguide 11 from physical contact. This prevents a mechanical stress from acting on the waveguide 11 located at the center of the optical device 3.

As shown in FIG. 4, the surface of the substrate is the mounting surface 1a in the direction perpendicular to the optical axis I. It follows that the mounting accuracy of the optical device 3 on the substrate 1 in the direction perpendicular to the optical axis I is determined by the filming accuracy of the projections 19 and the accuracy of control over the crystal growth for forming the device 3.

While the projections 19 are formed by conventional CVD (Chemical Vapor Deposition) or sputtering, their thickness can be controlled with the accuracy of the order of several hundred angstroms if the film thickness is accurately designed. Also, the waveguide 11 of the optical device 3 and the mounting surface 1a can be controlled with the accuracy of the order of several ten angstroms. Therefore, a positional accuracy of the order of several microns can be easily realized from the mounting surface 1a of the substrate 1 to the waveguide 11.

An experimental light-sensitive module having the structure shown in FIG. 4 was fabricated in order to evaluate its light-sensitive characteristic. When light was input to the module via the optical transmission member 25, the light-sensitive characteristic was only about 2% lower than the characteristic available with the member 25 located at its optimal position in terms of quantum efficiency. The experiment therefore showed that the total positional deviation of the member 25 and waveguide 11 was sufficiently less than 1 $\mu$m, and that the accuracy in the direction perpendicular to the optical axis I was sufficiently of the order of submicrons.

Figure 7:
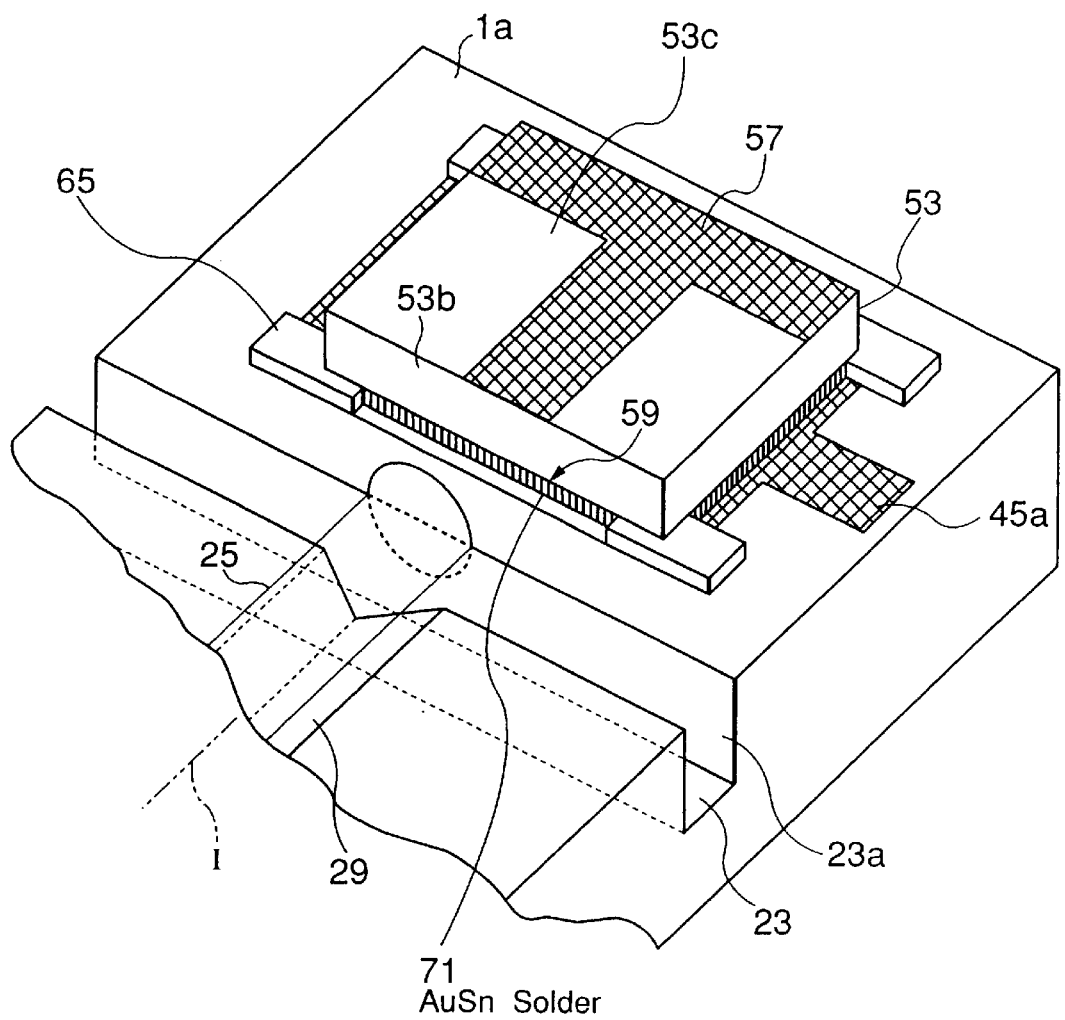
FIG. 7 is a perspective view showing an alternative embodiment of the present invention.
Figure 8:
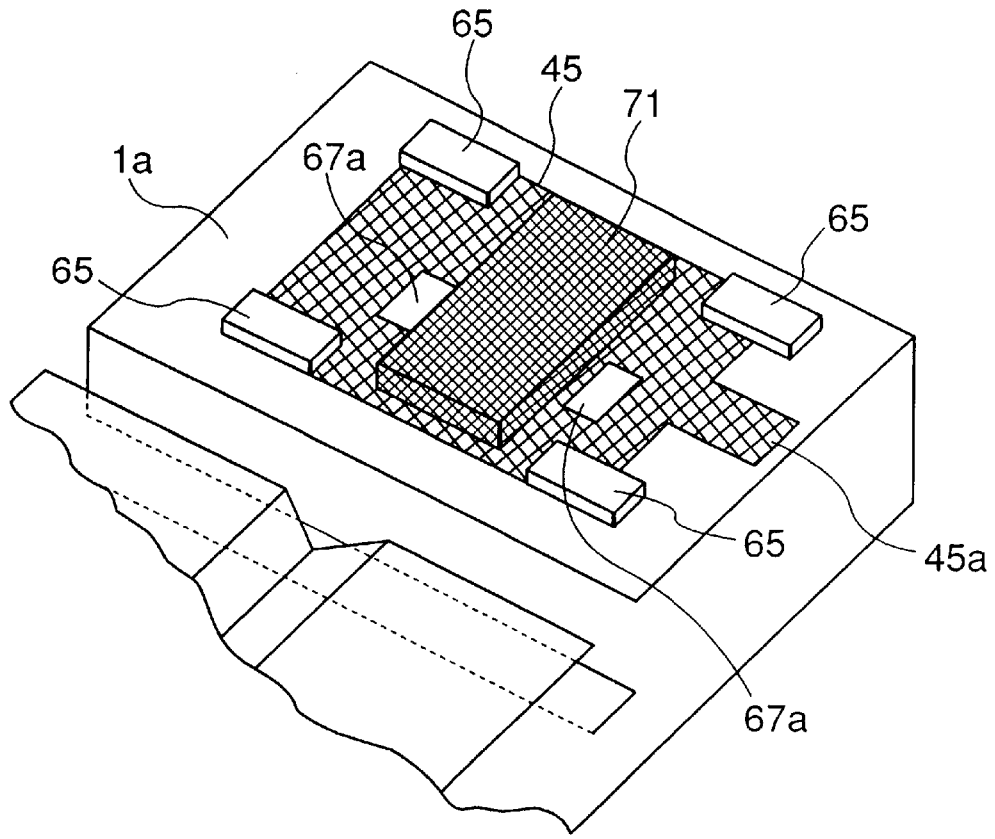
FIGS. 8 and 9 are perspective views respectively showing a substrate and an optical device included in the embodiment of FIG. 7.
Figure 9:
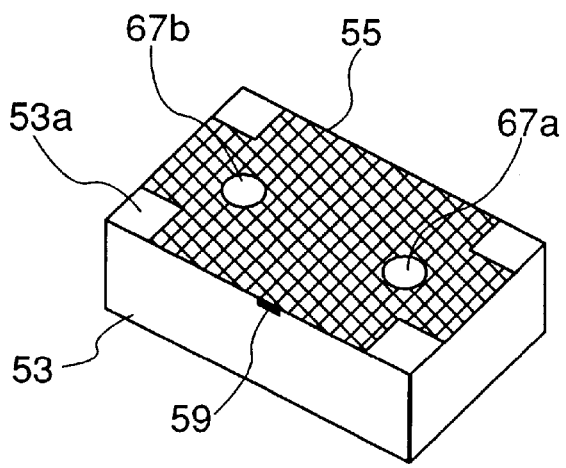

Reference will be made to FIGS. 7–9 for describing an alternative embodiment of the present invention. A mounting structure to be described is feasible for a semiconductor laser or similar optical device needing sufficient heat radiation. As shown, a first electrode 45 is provided on the mounting surface 1a of the substrate 1 such that the electrode 45 is connectable to an optical device 53. A second electrode 55 is provided on a surface 53a included in the optical device 53 such that the electrode 55 faces the first electrode 45. A connection member 71 connects the first and second electrodes 45 and 55 to each other.

The optical device 53 includes, in addition to the surface 53a, a surface 53b perpendicular to the surface 53a and a surface 53c parallel to the surface 53a. A third electrode 57 is formed on the surface 53c. The electrode 57 is made up of a portion parallel to the optical axis I and a portion perpendicular to the optical axis I.

A plurality of lugs 65 protrude from the mounting surface 1a for supporting the optical device 53 in contact with the surface 53a. The lugs 65 face the surface 53a except for the second electrode 55. The first electrode 45 partly extends to the outside of the optical device 53.

In the illustrative embodiment, the optical device 53 is implemented as a semiconductor laser. The first and second electrodes 45 and 55 and connection member 71 are respectively formed of the same materials as the electrodes and connection members of the previous embodiment.

A plurality of marks 67a and a plurality of marks 67b are respectively provided on the surfaces 1a and 53a in order to locate the optical device 53 at a preselected position on the surface 1a. The marks 67a and 67b are respectively included in the first electrode 45 and second electrode 55.

The second electrode 55 covers the surface 53a of the optical device 53 except for the four corner portions of the surface 53a in order to promote heat radiation. When the device 53 with the electrode 55 is mounted to the surface 1a of the substrate 1, the former is connected to the latter via the connection member 71 having a broad area and implemented by AuSu solder. This ensures sufficient heat radiation. In the direction perpendicular to the optical axis I, the lugs 65 and the surface 53a contacting each other guarantee accuracy of the order of submicrons.

Further, because the surface 53a contacts the lugs 65 at its four corners, the optical device 53 is free from angular displacement with respect to the plane of the substrate 1 and optical axis I. In addition, the connection member 71 plays the role of a packing, filling the gap between the second electrode 55 of the optical device 53 and the first electrode 45 of the substrate 1, preventing a mechanical stress from directly acting on the waveguide 59.

An experimental light-sensitive module having the structure shown in FIG. 7 was fabricated in order to evaluate its light-sensitive characteristic. When light was input to the module via the optical transmission member 25, the optical output was only about 0.5 dB lower than the optical output available with the member 25 located at its optimal position. The experiment therefore showed that the total positional deviation of the member 25 and waveguide 59 was sufficiently less than 1 $\mu$m, and that the accuracy in the direction perpendicular to the optical axis I was sufficiently of the order of submicrons.

In summary, in accordance with the present invention, after an optical device has been positioned on a substrate in a horizontal plane by using marks, a connection member or members are fused with projections or lugs contacting the surface of the device. Because accurately controllable crystal surfaces are used as references for mounting, mounting accuracy of the order of submicrons is achievable in the direction perpendicular to the optical axis of the optical device. Moreover, the optical device is mounted to the substrate at its peripheral portion other than an optical waveguide and emitting portion, the structure of the present invention is desirable in productivity, performance, and reliability.

What is claimed is:

1. A method for mounting an optical device with a high degree of accuracy, the method comprising the steps of:

providing a substrate including a mounting surface including phantom lines parallel to an optical axis;

mounting an optical device to said substrate, said optical device including a surface facing said mounting surface when said optical device is mounted to said substrate;

forming a plurality of first electrodes on said mounting surface and spaced from each other by a preselected distance to be connectable to said optical device;

forming a plurality of second electrodes on said surface of said optical device and corresponding one-to-one to said plurality of first electrodes;

connecting said plurality of first electrodes and said plurality of second electrodes with a plurality of first connection members;

forming an optical waveguide on said surface of said optical device spaced from each of said plurality of second electrodes by a preselected distance;

forming a third electrode on a part of said waveguide on said surface of said optical device;

forming a fourth electrode on said mounting surface facing said third electrode when said optical device is mounted to said substrate;

connecting said third and fourth electrodes with a second connection member; and forming a projection film on said mounting surface of said substrate such that said projection protrudes from a preselected portion of said mounting surface other than portions corresponding to said second and third electrodes and said waveguide of said optical device, said surface of said optical device being capable of contacting said projection thereby controlling a mounting accuracy of said optical device in a direction perpendicular to said optical axis.

2. The method of claim 1, wherein the forming of said projection comprises forming a pair of projections located outside of said first electrodes in a direction perpendicular to the optical axis.

3. The method of claim 1, further comprising the step of forming a channel in said surface of said optical device between said second electrodes.

4. The method of claim 1, wherein the forming of said projection comprises forming a plurality of lugs.

5. The method of claim 1, wherein the step of providing said substrate comprises the step of fabricating said substrate from Si and the step of forming said projection comprises the step of forming said projection with an $SiO_2$ film.

6. The method of claim 1, further comprising the step of locating said optical device at a preselected position on said mounting surface.

7. The method of claim 6, wherein the locating step comprises providing each of said mounting surface of said substrate and said surface of said optical device with a plurality of marks.

8. A method for mounting an optical device, the method comprising the steps of:

providing a substrate including a mounting surface including phantom lines parallel to an optical axis;

mounting an optical device to said substrate, said optical device including a surface facing said mounting surface when said optical device is mounted to said substrate;

providing an optical device to be mounted to said substrate and including a first surface facing said mounting surface when said optical device is mounted to said substrate;

providing a first electrode on said mounting surface to be connected to said optical device when said optical device is mounted to said substrate;

providing a second electrode on said first surface of said optical device and corresponding to said first electrode;

providing a connection member for connecting said first electrode and second electrodes;

providing a third electrode on a second surface of said optical device facing said first surface; and forming a plurality of lugs by a film-forming process on said mounting surface of said substrate, the plurality of lugs protruding from said mounting surface thereby controlling a mounting accuracy of said optical device in a direction perpendicular to said optical axis, said plurality of lugs facing said first surface of said optical device except for said second electrode when said optical device is mounted to said substrate.

9. The method of claim 8, further comprising the steps of:

positioning an optical transmission member for optical transmission from said optical device; and preventing said optical transmission member from moving in the direction of the optical axis.

10. The method of claim 9, wherein the preventing step comprises:

providing said optical device with a third surface perpendicular to said first surface and the optical axis; and providing said mounting surface of said substrate with a stop groove adjoining and parallel to said second surface of said optical device and a positioning groove extending from said stop groove in a direction of the optical axis.

11. A method for mounting an optical device with a high degree of accuracy, the method comprising the steps of:

forming an optical device by crystal growth technology;

mounting said optical device on a substrate;

forming a projection film on said substrate by a film forming technology for supporting said optical device and positioning said optical device in a direction perpendicular to an optical axis thereby mounting said optical device with a high degree of accuracy in said direction perpendicular to said optical axis; and providing a plurality of marks on each of said substrate and said optical device for positioning said substrate and said optical device in a horizontal direction.

* * * * *